(12) United States Patent
Qian et al.

(10) Patent No.: US 9,306,419 B2
(45) Date of Patent: Apr. 5, 2016

(54) DUAL MODE WIRELESS CHARGING SOURCE AND SINK

(71) Applicant: Cellco Partnership, Arlington, VA (US)

(72) Inventors: Nanjun Qian, Princeton, NJ (US); Yuk Lun Li, Morganville, NJ (US); Christopher Schmidt, Branchburg, NJ (US); Balaji Raghavachari, Bridgewater, NJ (US); Praveen Venkataramu, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 137 days.

(21) Appl. No.: 13/728,591

(22) Filed: Dec. 27, 2012

(65) Prior Publication Data

US 2014/0183962 A1 Jul. 3, 2014

(51) Int. Cl.
G08B 5/22 (2006.01)
H02J 17/00 (2006.01)
H02J 7/02 (2006.01)
H02J 7/00 (2006.01)

(52) U.S. Cl.
CPC .................. *H02J 17/00* (2013.01); *H02J 7/025* (2013.01); *H02J 2007/0096* (2013.01)

(58) Field of Classification Search
CPC ....... H04B 5/0037; H01F 38/14; H02J 7/0013
USPC ......... 340/7.37, 10.34, 12.37, 13.24; 307/104
See application file for complete search history.

(56) References Cited

U.S. PATENT DOCUMENTS

| 8,278,784 | B2* | 10/2012 | Cook et al. ..................... 307/149 |
| 8,338,990 | B2* | 12/2012 | Baarman et al. ............... 307/104 |
| 2010/0264746 | A1* | 10/2010 | Kazama et al. ................ 307/104 |
| 2012/0206096 | A1* | 8/2012 | John ............................ 320/108 |
| 2012/0293119 | A1* | 11/2012 | Park et al. ...................... 320/108 |
| 2012/0326658 | A1* | 12/2012 | Kim et al. ...................... 320/108 |
| 2013/0057077 | A1* | 3/2013 | Rothschild .................... 307/104 |

* cited by examiner

*Primary Examiner* — Vernal Brown

(57) ABSTRACT

A first device may have a processor and a power management system configured to receive a request from a second device. The first device may receive attribute data from the second device and compare the attribute data of the second device to attribute data of the first device. The first device may then determine whether the second device is a qualifying device based on the comparison and it may also determine a power transfer mode of the first device based on whether the device is a qualifying device and on the attribute data of the first and second device.

20 Claims, 5 Drawing Sheets

DUAL MODE WIRELESS CHARGING SOURCE AND SINK

BACKGROUND INFORMATION

Inductive, or wireless charging, may be used to charge the battery of an electronic device. An electromagnetic field may be used to transfer energy from one object to another. Such magnetic resonance charging may include a charging device having an induction coil configured to create an alternating electromagnetic field. A second receiving device may also have an induction coil configured to receive power from the created electromagnetic field. Existing systems, however, may require the charging device and the receiving device to be in close proximity to one another. Existing systems are inefficient and unable to facilitate efficient and practical power transfer between devices.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
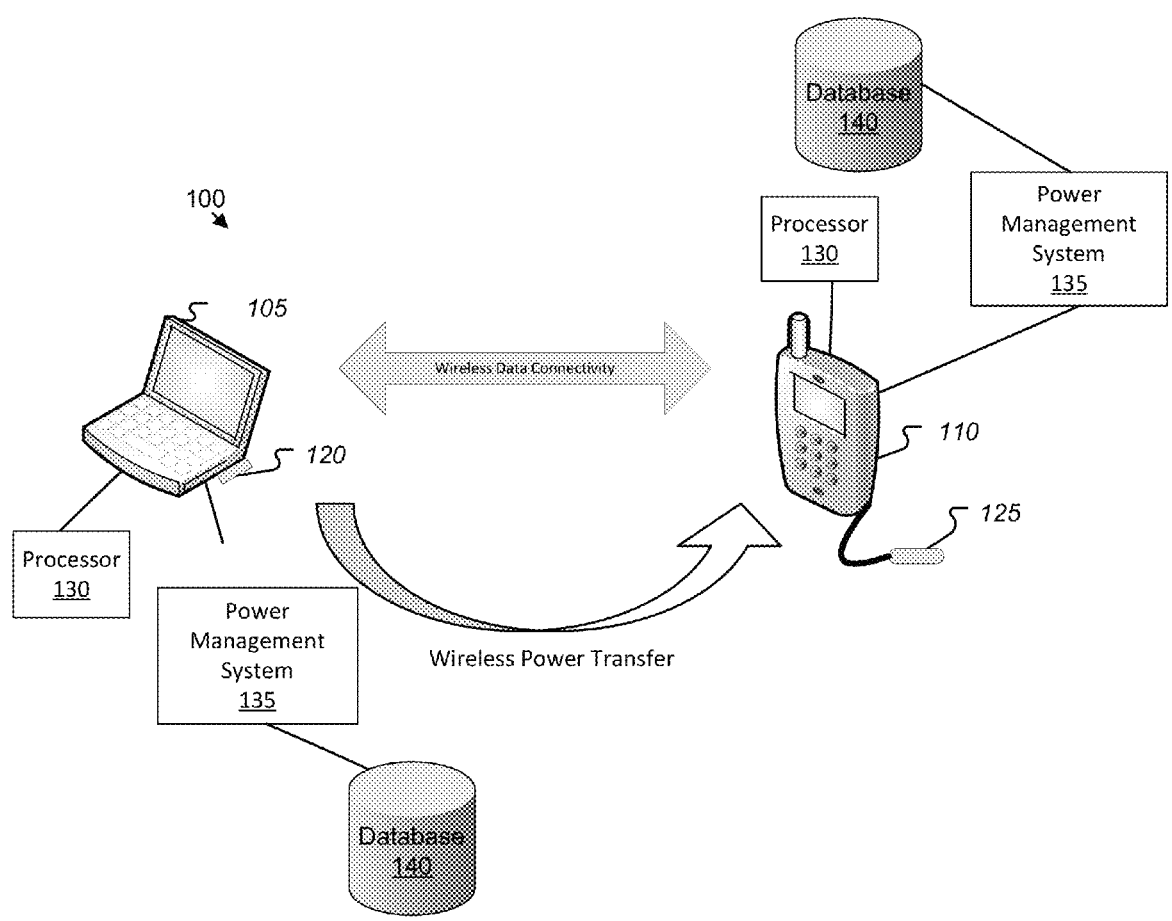
FIG. 1 shows an exemplary charging system.

Referring now to the discussion that follows and also to the drawings, illustrative approaches to the disclosed apparatuses and methods are shown in detail. The descriptions set forth herein are not intended to be exhaustive or otherwise limit or restrict the claims to the precise forms and configurations shown in the drawings and disclosed in the following detailed description.

An exemplary system provides a power management system in either device is configured to efficiently manage wireless power transfer between a plurality of devices within a premise. The management system may include a first device having a power transmitter and receiver and a second device having a power transmitter and receiver. A control function within the power management system may be configured to control the directional alignment of the transmitter and receiver so as to optimize the wireless power transfer between the two devices. Further, the second device may operate as a hot spot and provide wireless capabilities to the first device. In exchange, the first device may wirelessly transfer power to the second device. While the first device may provide power to the second device, the first device may also receive power from another device, or act as a power "sink" instead of a power source. The power management system may determine whether a device is to operate as a sink or a source based on attribute data collected from the devices within the premise. Moreover, the power management system may prioritize what devices should receive power, and from where the power should be received. Accordingly, disclosed is a dual mode device managed by a power management system to efficiently and effectively manage wireless power transfer.

FIG. 1 is an exemplary magnetic resonance charging system 100 showing a first device 105 and a second device 110 within a premise. A premise may include a device and its surrounding area. The premise may be an open area or room such as an office, a conference room, etc. While the first device 105 is shown as a laptop computer and the second device 110 is shown as a mobile device, the first device 105 and second device 110 may each be a single computing device, or one of multiple computing devices, having a processor 130 for executing computer-executable instructions, and a memory and/or other computer readable media for storing data and computer-executable instructions. For example, the first device 105 and second device 110 may be one of a smart phone, personal digital assistant, laptop computer, desktop computer, tablet computer, etc.

Each of the first and second devices 105, 110 may include a device such as power transmitter and/or receiver. The first device may include a transmitter/receiver 120 and the second device may also include a transmitter/receiver 125. In one example, the first device 105 may include a transmitter and the second device 110 may include a receiver. The transmitter/receiver 120, 125 of the first and second devices 105, 110 may be built into the respective devices. Additionally or alternatively, the transmitter/receiver may also be separate devices connected to a charge port of each of the first and second devices 105, 110 via a cable (see e.g., transmitter/receiver 125.) The transmitter/receiver may also be configured to connect to a device via a USB port within the device. Moreover, in the examples to follow, while the first device 105 may be described as having a wireless power transmitter, and the second device 110 may be described as having a wireless power receiver, each may also include the other. For example, the first device 105 may include both a wireless power transmitter and a wireless power receiver. In another example, any of the devices may also include a transceiver including both a transmitter and receiver. Additionally, antennae may be included in one or both of the first device 105 and second device 110. The antennae may function as a transmitter/receiver pair.

A transmitter within the transmitter/receiver 120, 125 may include an induction coil configured to create an alternating electromagnetic field. A receiver may also include an induction coil configured to receive the power transmitted by the transmitter 120. The receiver may then convert the power into electrical current and supply it to the second device 110. The transmitter coil and the receiver coil may be configured to resonate at the same frequency. This may in turn create resonant coupling between the devices and allow power to be transferred at a greater distance between the first device 105 and second device 110. Such types of transmitter/receiver may be attached to a USB connector configured to be inserted into a USB port of a device. Additionally or alternatively, the transmitter/receiver 120, 125 may be attached to a connector configured to be inserted into a charge port of a device, such as a charge port of a mobile phone or personal computer. The transmitter/receiver may then be physically directed towards another transmitter/receiver. For example, a user of the first device 105 may direct the transmitter 120 towards the receiver 110 of the second device 110. Because resonance has been placed on the coils, power may be transmitted from one transmitter to a receiver at greater distances. Thus, it is not necessary for the coils of each of the transmitter and receiver to be placed on top of one another. Instead, the coils need only face the general direction of each other.

Each of the first and second devices 105, 110 may include a processor 130 and a power management system 135. The power management system 135 may control the exchange of power between the devices. The power management system 135 may include a database 140. The database 140 may be configured to include a table of attribute data about each device within the system 100. The power management system 135 may also have a mode function 150, a priority function 155 and a control function 160. Generally, the mode function 150 determines whether a device is to function as an energy source or energy sink. The priority function 155 determines a priority for which of a plurality of devices may operate in a given mode. The control function 160 controls the location and direction of the transmitters and receivers within the devices of the system. These functions are described in more detail with respect to FIG. 2.

While the figures indicate that each device within the system 100 includes a power management system 135, this is not necessary. Only a portion of the devices may include a power management system 135. For example, in referring to FIG. 1, the first device 105 may include a power management system 135 while the second device 110 may not. In another example, referring to FIG. 3, the first device 105 and third device 180 may each include a power management system.

In the exemplary configuration shown in FIG. 1, the transmitter/receiver 120 may include a transmitter so that the first device 105 may provide power via the power transmitter to a power receiver of the transmitter/receiver 125 of the second device 110. The second device 110, as explained, may be a mobile device capable of simultaneously providing wireless communication or wireless network capabilities. For example, the second device 110 may provide the capabilities of a Wireless LAN (WLAN). The second device 110 may also provide a hotspot for providing Wi-Fi access. Accordingly, the second device 110 may provide the first device 105 with WiFi access while the first device 105 supplies the second device 110 with power. As explained, the first and second device 110 may reverse their roles, in which case the first device 105 may receive wireless power from the second device 110. Additionally or alternatively, the first device 105 may provide both the wireless capabilities as well as power to the second device 110.

As described in more detail herein, the devices may be configured to communicate with each other. The devices may communicate via a wireless network such as Wi-Fi, Bluetooth, cellular networks, ad-hoc wireless networks, etc. The second device 110 may be configured to provide wireless communication capabilities to the first device 105. As described above, the second device 110 may provide a hot spot and thus wireless capabilities to the first device. Once a wireless connection has been created between the devices, the second device 110 may send a request to the first device 105. In one example, the second device 110 may transmit a message to the first device 105, wherein the message includes a request for the first device 105 to provide power to the second device 110. The message may also include additional information such as attribute data. Each device may be configured to identify a specific type of protocol and thereby be configured to transmit information back and forth. For example, if the devices are communicating via Bluetooth capabilities, the two devices may be paired and may communicate by sending packets and/or messages to one another using the Bluetooth protocol.

As mentioned, the devices may wirelessly transfer attribute data to each other. The attribute data may also include instructions for what mode a specific device is to operate in. Alternatively, a separate command may be sent from one device to another instructing the receiving device to operating in a specific mode. As an overview, a second device 110 may request power from a first device 105. The second device 110 may transmit its attribute data to the first device 105. This attribute data may be used by the power management system 135 of the first device 105 to determine whether to grant the second device's request. The first device 105 may return a command to the second device 110 indicated that the second device may operate in the receive mode. This process is described in more detail below with respect to FIGS. 4 and 5.

The attribute data transmitted between devices may include information about device settings and power configurations. For example, attribute data may include a plurality of attributes such as a device type (e.g., mobile device, independent transmitter, laptop computer, etc.), a power source type (e.g., battery or adaptor), amount of battery power remaining, location of the device, anticipated power consumption, etc. Attribute data may be stored in the database 140 and used by the power management system 135 to facilitate efficient power transfer between multiple devices. For example, the data may be used by the power management system 135 to decide which device should transmit power and which device should receive power. In one example, the first device 105 may transmit attribute data that specifies the battery life of the first device's battery. The second device 110 may use this information to determine if the second device 110 may receive power from the first device 105. This attribute data is described in more detail below as it relates to the power management system 135 and the functions therein.

As explained, not all devices may include a power management system 135. If, for example, the first device 105 includes a power management system 135, and the second device 110 does not, the first device may be responsible to make any power management determinations while the second device 110 is configured to comply with commands sent from the first device 105. If the second device 110 does include a power management system 135, the second device 110 may make the determination. Typically, if more than one device includes a power management system 135, the device receiving the request for power will make the power management determinations.

Figure 2:
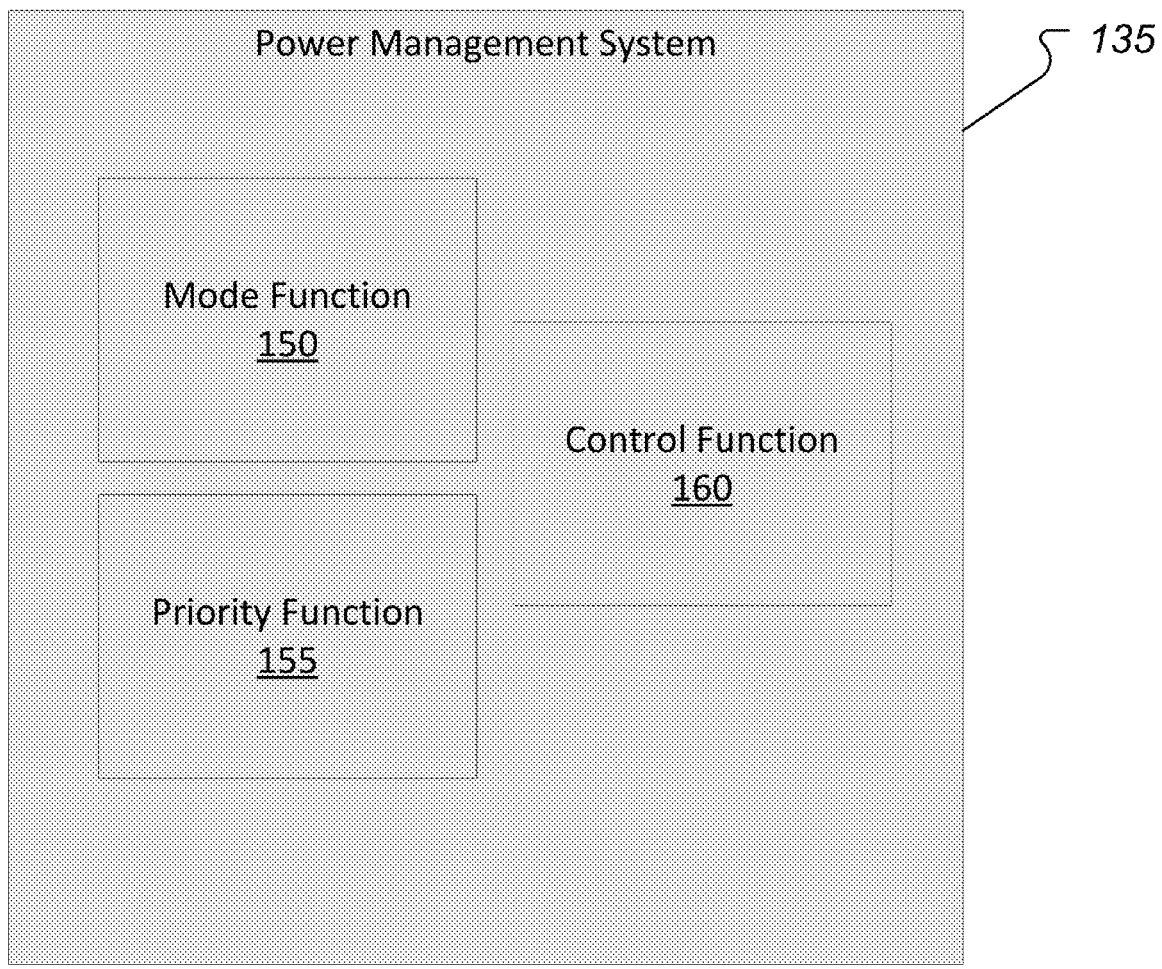
FIG. 2 shows an exemplary power management system.

FIG. 2 shows an exemplary power management system 135. One or more of the devices within the system 100 may include a power management system 135. The power management system 135 may maintain attribute data about each device in the database 140 and control the wireless power transfer between the devices.

As explained, the power management system 135 may have a mode function 150, a priority function 155 and a control function 160. The mode function 150 may determine what mode a particular device should function in based on received attribute data. For example, certain devices may act as a power source, power sink, or both, depending on the situation within the premise. The first device 105 may function as a power source in a transmit mode, while the second device 110 may function as a power sink in a receive mode. Alternatively, the first device 105 may function as a receiver while the second device 110 may function as a transmitter. In one example, the attribute data may include the battery power of each device. If two devices are located in a predefined proximity to one another, the device with the lowest battery power may be determined to operate in the receive mode, while the device with the most battery power is to operate in the transmit mode. Alternatively, the devices may have predefined roles based on predefined preferences defined in the attribute data. For example, if the first device 105 is a laptop computer, and the second device 110 is a mobile device, the preferences may be defined so that the mobile device may only operate in the receive mode. Thus, while the laptop computer may operate in both the transmit mode and receive mode, the mobile device may not. These preferences may be predefined by the power management system. Alternatively, the preferences may be established by a user of the power management system 135 at any of the devices. The process of determining the mode of a device is described in more detail with respect to FIG. 4.

Figure 3:
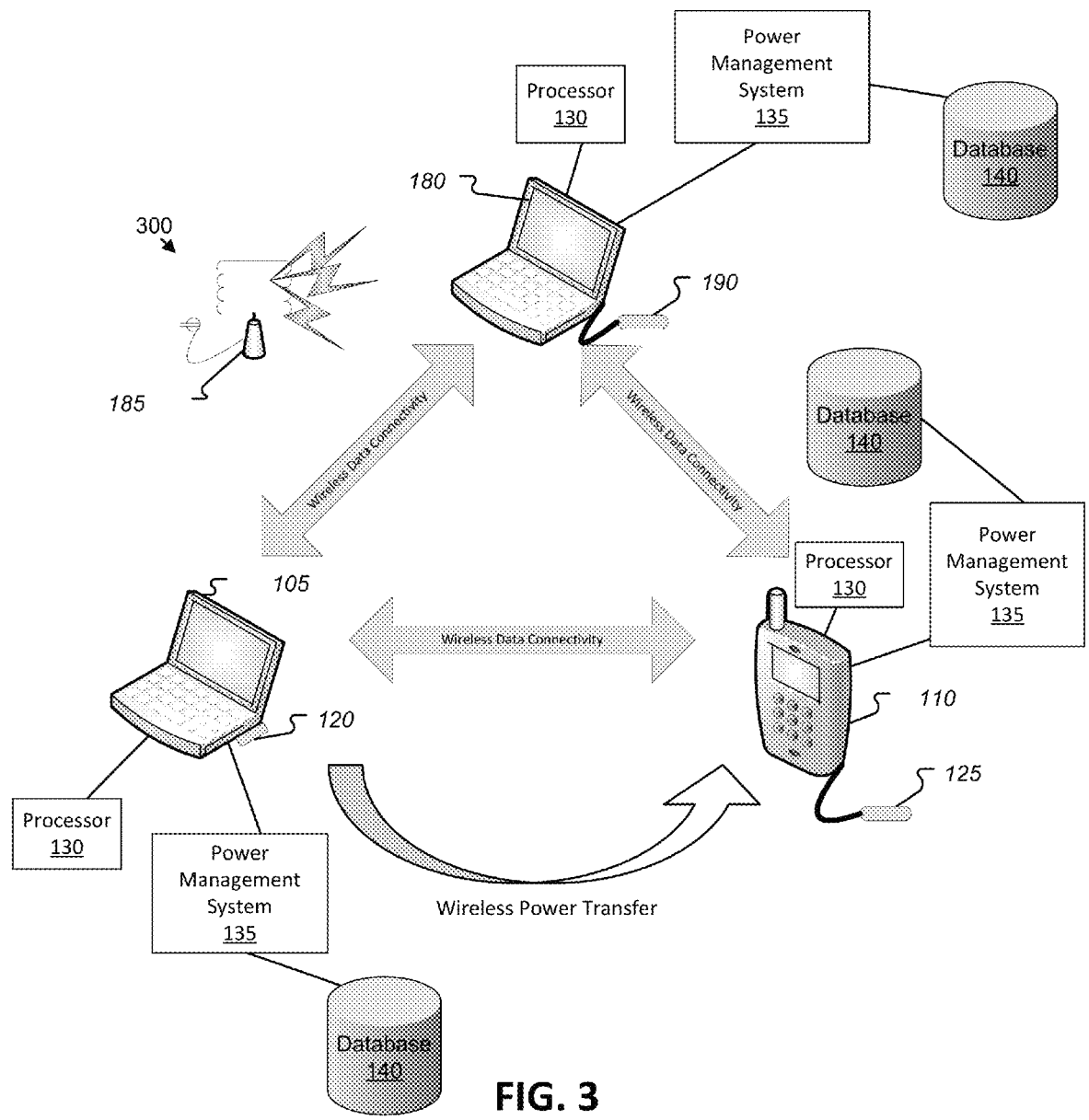
FIG. 3 shows another exemplary charging system.

The priority function 155 may be called by the power management system 135 when it is determined that more than one device may operate in a specific mode. For example, if two laptop computers are present within a premise, as shown in FIG. 3, and both devices may operate in the transmit mode, the priority function 155 may select one of the devices as the priority device. This selection may be made based on the attribute data acquired from the devices. The determination may be made to best optimize power transfer. For example, one device may be selected to transmit power over another device based on the device's proximity to the requesting device. This function is described in more detail with respect to FIGS. 4 and 5 below.

The control function 160 may control the physical direction of the transmitter/receivers 120, 125. The control function 160 may detect the location of a second device 110 relative to the first device 105. It may occur that the transmitter of one device is not directed towards the receiver of another device. Thus, when the transmitter of the first device 105 emits power, some of the power may be lost before reaching the receiver of the second device 110. As explained above, however, the transmitter//receivers 120, 125 may each also be rotatable about a center point and therefore radially flexible. The control function 160 may control the transmitter's directional position so that it may face the receiver, thus optimizing the power transfer.

The control function 160 of the power management system 135 may be able to detect the location of the first device 105 relative to the second device 110. That is, the control function 160 may be able to determine the location of the transmitter/receiver 120 of the first device 105 with respect to the transmitter/receiver 125 of the second device 110. This may be done using global positioning system (GPS) technology and/or Assisted GPS (AGPS). This may also be accomplished using Bluetooth or Wi-Fi location capabilities. When the first device 105 and the second device 110 are in communication with each other, the GPS coordinates of one device may be sent to the other device. The control function 160 may compare the two GPS coordinates to determine the relative position of the devices. The GPS coordinates may be compared against a common transmission point as well, thus giving the distances between various devices relative to that transmission point. For example, the transmission point may be the independent transmitter 185, as shown in FIG. 3. Additionally or alternatively, the received attribute data may also include the location of a device. Once the location of the devices has been determined, each transmitter/receiver 120, may be moved (e.g., rotated or moved linearly) within their respective device to align with the other transmitter/receiver 125. For example, the transmitter/receiver may be held by a receptacle within the respective device. The transmitter/receiver 120, 125 may rotate within the receptacle to better position itself in the direction of the other device. In the example of the transmitter/receiver 120, 125 being an antenna, the antenna may not necessary physically move, but it may transmit the power toward the other transmitter/receiver via a beam, as opposed to transmitting power radially outwardly from the antenna. In another exemplary configuration, the transmitter/receiver may not be integral with the device. As described above, the transmitter/receiver may be separate from the device and may be attached to the device via a port within the device (e.g., USB port.) In this example, the direction of the transmitter/receiver may be manually adjusted. Moreover, in the event that the devices are in close proximity to one another, the transmitter/receivers of the devices may be capable of transmitting power between them without adjustment of their orientation.

By permitting the transmitters and receivers of at least one of the devices to move or to direct the power transmission towards the receiving device, the focus of the power transmission may be directed directly towards the receiver, thus increasing the efficiency of the power transfer. Furthermore, there is a less likelihood of obstruction from another device or object, as well as a less likelihood of another device piggy backing off of the power transfer.

In an example where there are more than two devices within a proximity capable of receiving or emitting power (see e.g., FIG. 3), the transmitter/receiver of the device emitting the power may be directed towards the device receiving the power. Thus, any other device in the proximity may not be charged by the first device 105, and even if it tries to, it will not receive power as efficiently or to the extent that the second device 110 will due to the direction of the transmitter/receiver 120. Further, the receiver of a device may be directed towards the device with the highest stored power, e.g., battery power, so as to not deplete another device with already lower power storage.

FIG. 3 is an exemplary charging system 300 similar to FIG. 1. FIG. 3 also includes a third device 180 and an independent transmitter 185. The third device 180, although depicted as a laptop computer, may be a single computing device, or one of multiple computing devices, having a processor 130 for executing computer-executable instructions, and a memory and/or other computer readable media for storing data and computer-executable instructions. For example, the third device may be a smart phone, personal digital assistant, laptop computer, desktop computer, tablet computer, etc. The third device 180 may also have a transmitter and/or receiver 190.

The independent transmitter 185 may operate as a charging station and may have an induction coil and be configured to create an electromagnetic field and transmit power to another device, such as the first, second or third device 105, 110, 180. The independent transmitter 185 may be powered by an AC source (e.g., a wall outlet). In a system with multiple devices configured to transmit and receive wireless power, the power management system 135 may be configured to determine which device is to operate in the transmit mode and which device is to operate in the receive mode. Additionally, the power management system 135 may prioritize and decide which of the devices should receive and transmit power when more than one of the devices could fill each role. This is discussed in more detail below.

Figure 4:
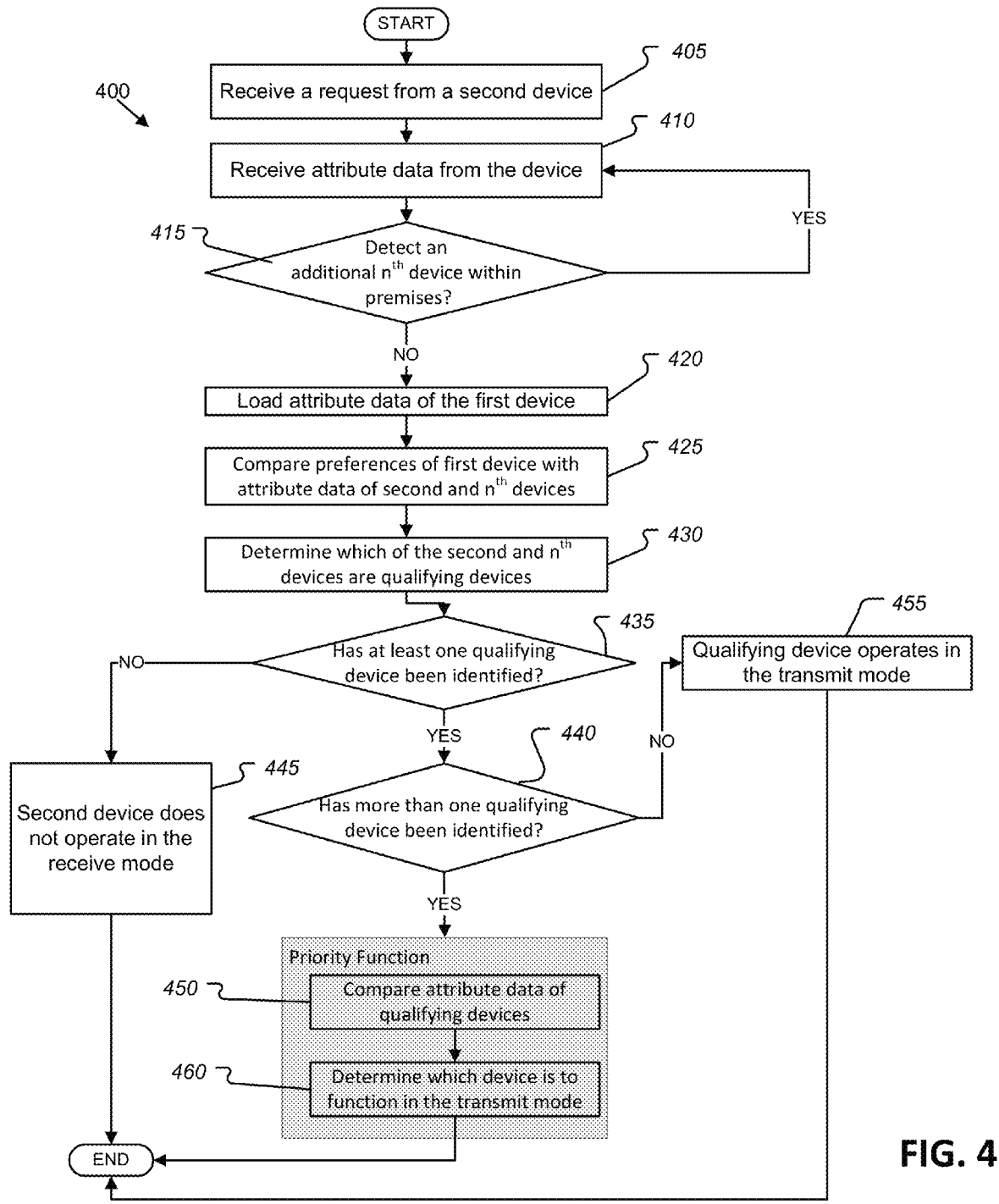
FIG. 4 shows flow chart for an exemplary process of the power management system.

FIG. 4 show an exemplary process 400 for determining the mode of a device.

The process 400 begins at block 405. A first device 105 may receive a request from a second device 110. The request may be sent over the wireless network, as described above. The request may include information identifying the second device 110 as well as identifying a desired operating mode for at least one of the first device 105 and second device 110. In one example, the second device 110 may be requesting power from the first device 105. Thus, the request may identify a desire for the first device 105 to operate in the transmit mode, and the second device 110 to operate in the receive mode. In another example, the request may only indicate that the second device 110 wishes to receive power, without identifying a source of that power. As explained, for exemplary purposes only, the first device 105 may be a laptop computer and the second device 110 may be a mobile device. Each device may include a power management system 135. Alternatively, only one of the devices may include a power management system 135. Once a request is received, the process proceeds to block 410.

At block 410, the attribute data of the second device 110 is received at the first device 105 from the second device 110. Additionally or alternatively, the attribute data may be received along with the request for power transfer. The attribute data may include various attributes about the second device 110 and its power configurations, as described above. The process proceeds to block 415.

At block 415, the power management system 135 at the first device 105 determines if there are any additional devices within the premise. If the first device 105 detects another device in proximity to the first device 105, e.g., the third device 180, the process returns to block 410 and the first device 105 requests and receives attribute data from the detected device. This process continues for each $n^{th}$ device until no other devices are detected. Additionally or alternatively, the first device 105 may receive attribute data from any device within the proximity at predetermined temporal increments, regardless of whether a request was made by one of the devices. When the first device 105 has received attribute data from each detected device, the process proceeds to block 420.

At block 420, the first device 105 loads or retrieves the attribute data of the first device 105. The attribute data of the first device 105 may be stored within the database 140 of the first device 105. As described above, the attribute data of the first device 105 may include preferences for the first device 105. The preferences for the first device 105 may include information related to the settings of the first device 105. For example, the preferences may define certain power transfer rules such as when the first device 105 may operate in the transmit mode and when the first device 105 may operate in the receive mode. In one situation, the preferences may establish a rule whereby the first device 105 may only operate in the transmit mode when the battery life of the first device 105 exceeds that of the second device 110. Additionally or alternatively, the first device 105 may only operate in the transmit mode if the second device 110 is determined to be a certain type of device, such as a mobile device. In this instance, it may only be practical for power to transfer from the laptop to the mobile device and not the other way around.

In the example shown in FIG. 3, the second device 110 may send a request to one or both of the first device 103 and third device 180.

At block 425, the attribute data of the first device 105 may be compared with the attribute data of the second device 110 and any other detected $n^{th}$ devices. This may occur at the power management system 135 of the first device 105. Alternatively, the comparison may occur at the second device 110 or the third device 180. In a system 100 with more than two devices, one device may be considered the master device. The power management system 135 of the master device may be responsible for determining the modes for each device within the premises. Thus, if more than one of the first, second, and third devices 105, 110, 180 include a power management system 135, one of the devices 105, 110, 108 may be the master device. The master device may be determined by the requesting device. For example, if the second device 110 requests power, then the second device 110 may be considered the master device. Alternatively, the device receiving the request may also be defaulted to as being the master device. In this example, if the first device 105 receives a request for power, the first device 105 may make the determination with respect to the modes of each device. Once a request is received, the power management system 135 of the first device 105 may send a message to the second device 110 indicating that it received the request and is processing the request. Thus, the second device 110 may be aware that the first device 105 is processing the request. The master device may request attribute data from each device to be used by the respective power management system 135 to determine the mode for each device. Once attribute data is collected, the identified master device may change over time. For example, if the first device 105 is the current master device, and if the first device's power level drops below a threshold, the third device 180 may then become the master device, and all processing and comparing may be done by the third device 180.

Figure 5:
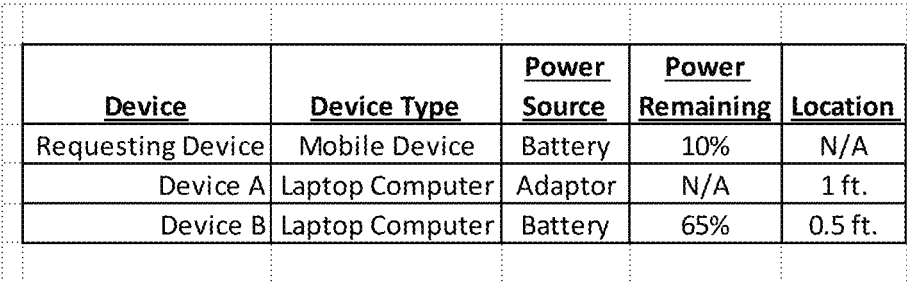
FIG. 5 shows an exemplary table that may be used by the power management system.

Once the master device is identified, the power management system 135 of the master device may be configured to compare the attributes of each detected device within the premises at its power management system 135. The comparison, for example, may include comparing the battery life, location, device type, power usage history, etc., of each device. The power management system 135 may compare the various attributes by creating a file within the database 140. The file may include a table listing the various attributes of each device. An exemplary table is shown in FIG. 5 and discussed below.

At block 430, the power management system 135 may then determine which of the devices are considered qualifying devices. Qualifying devices may be determined based on the threshold attributes defined in the attribute data of the first device 105. Qualifying devices may meet or exceed thresholds and rules established by the preferences within the attribute data. The first device 105 may be a qualifying device, as well as any of the $n^{th}$ devices. In an example, the preferences may only allow the laptop to operate in the transmit mode if the battery power of the laptop exceeds the battery power of the second requesting device. In another example, a mobile device may not be permitted to operate in a transmit mode. Thus, if the first device 105 is a mobile device, it may not operate in the transmit mode and charge the second device 110. In another example, the attribute data of the first device 105 may include a rule defining a minimum battery life of the first device 105 in order for the first device 105 to operate in the transmit mode. Additionally or alternatively, the at least one rule may be stored in the database 140 of the respective device. Once the attribute data of the devices has been compared with the preferences of the first device 105, the process proceeds to block 435.

At block 435, the power management system 135 determines whether at least one qualifying device has been identified. If so, the process proceeds to block 440. If no qualifying devices have been identified, the process proceeds to block 445.

At block 445, if no qualifying devices have been identified, then none of the detected devices within the premise of the second device 110 qualify to operate in the transmit mode, and therefore no devices may be used to transfer power to the second device 110. Thus, if no device is considered a qualifying device, then none of the devices within the system 100 may transmit power. At most, in the event that a request for power was received from another device, the second device 110 may be permitted to operate in the transmit mode to transfer power to another device, depending on the circumstances. In this example, both the first and second devices 105, 110 may be requesting power. However, because both battery levels may be below the threshold, neither device may be permitted to transfer power to the other. If no qualifying devices are found, the process then ends. The first device 105 may transmit a message to the second device 110 indicating that the second device 110 will not be receiving power from any device within the premises. This message may in turn be used by the second device 110 to inform the user of the device 110 via an interface within the device 110 that the device will not be charged via wireless power transfer.

At block 440, if a qualifying device has been identified, the power management system 135 then determines whether more than one device has been identified as a qualifying device. By identifying a qualifying device, the system is identifying a device that may be permitted to operate in the requested mode. If more than one device has been identified as a qualifying device, the process proceeds to block 450. If only one device has been identified, the process proceeds to block 455.

At block 455, the qualifying device is determined and instructed to operate in the requested mode, e.g., transmit mode. Because the device has met all of the preferences defined in the attribute data, the device may receive a message from the power management system 135 indicating that it is to operate in the transmit mode and transmit power to the second device 110, as requested. Additionally or alternatively, a message may be sent to the second device 110 instructing it to operate in the receive mode. The process then ends.

At block 450, if more than one qualifying device has been identified, it may be necessary to determine which of the qualifying devices should operate in the requested mode. The power management system 135 may compare the attribute data of the qualifying devices. Blocks 450 and 455 may be executed, at least in part, by the priority function 155. A table, as shown in FIG. 5, may be used to organize and compare the various attribute data of the qualifying devices. This process is described in more detail with respect to FIG. 5. Once the comparison has been made, the process proceeds to block 460.

At block 460, the power management system 135 determines which qualifying device is to function in the requested mode based on the comparison of attribute data. As explained, this determination may be made, at least in part, by the priority function 155 within the power management system 135. The selected device may then be instructed to operate in the requested mode. For example, the first device 105 may be instructed to transmit power to the second device 110 as requested. The process then ends.

While FIG. 4 shows the process ending, the power management system 135 may routinely and periodically check for additional devices and acquire attribute data for the new devices as well as subsequent attribute data from the current devices within the premise during power transfer. Thus, the process may continue in the background while power is being transferred from one device to another. For example, the power management system 135 may acquire attribute data from each device at a predetermined increment, such as every five minutes. Additionally or alternatively the power management system 135 may receive attribute data if the system detects a change in circumstances. For example, if the battery power of the first device 105 is depleted and the second device 110 may no longer receive power from it, attribute data from the devices may be acquired in an effort to find additional power sources for the second device 110. Similarly, a predefined battery threshold may be established, such that if and when that threshold is reached, the first device 105 no longer transmits power to the second device 110. For example, if a predefined battery threshold is 10%, if and when, while charging the second device 110, the first device's battery threshold falls below 10%, the first device 105 may stop transmitting power to the second device 110 in order to preserve its own power.

Further, some attribute data, such as the predefined preferences, may be constant, while other attribute data, such as the battery life and location, may change over time. During the periodic retrieval of attribute data, the power management system 135 may only receive attribute data for those attributes that have changed. By decreasing the amount of data being transferred and processed, the system may operate more efficiently.

Once process 400 has established what mode a device may operate in, and once process has established the priority device, the control function 160 of the power management system 135 may be called. The control function 160 may direct the respective transmitters and receivers to be directed towards each other according to the determinations made by the mode function and the priority function. Thus, the power management system 135 facilitates efficient wireless power transfer between devices by implanting all three functions when necessary.

While process 400 is described with respect to a second device 110 requesting power transfer from a first device 105, the second device 110 may also receive requests for power transfer. Moreover, while process 400 describes the power management system 135 with respect to the first device 105, any device within the premise may include a power management system 135 and use it to efficiently manage wireless power transfer between devices.

FIG. 5 shows an exemplary table 500 showing various attributes of various devices within a premise. Table 500 is an example of one that may be used by the priority function 155. While FIG. 5 lists various attributes included in the attribute data, FIG. 5 is exemplary. More or less attributes may be included and the attributes may differ from what is shown in FIG. 5. Further, during the periodic retrieval of attribute data, as described above, the table 500 may be updated accordingly to reflect the most recent data and therefore make a determination as to priority based on the most recent device configurations.

FIG. 5 shows a listing of several qualifying devices. These devices may have a unique device identifier within the power management system 135. In the exemplary table 500, the requesting device is a mobile device having a battery power of 10%. Device A and Device B are both laptop computers. Device A is supplied with power via an AC adaptor, or traditional plug in. Thus, Device A is supplied with power from a wall outlet on an as needed basis. Device B, however, is supplied with power from its battery, which is currently charged at 65%. Device A has been determined by the power management system 135 to be 4 meters away from the requesting device, while Device B has been determined to be 2 meters away. The priority function 155 of the power management system 135 may look to a single factor in determining which of the qualifying devices should provide power to the requesting device. For example, the priority function 155 may select the device that is closest to the requesting device, thus optimizing the power transfer between the two devices. The priority function 155 may base its priority determination on the device type, wherein a laptop computer may be preferred over other devices, such as a mobile device. The type of power source may also be a determining factor wherein a device drawing from an adaptor may be preferable to a battery powered device.

Additionally or alternatively, a single factor may not be dispositive in prioritizing power transmitting devices. Several factors may be weighed and taken into consideration. In one example, both the location and power source type may contribute to the determination wherein the location is slightly more important than the power source type. In the example shown in FIG. 5, while Device A may have the preferable power source type, Device B is in closer proximity to the requesting device, and therefore may be selected to operate in the transmit mode. These determinations may be based on the preferences established in the attribute data. Various combinations of attributes at varying weights may be used to prioritize the devices for supplying power to the requesting device.

Specific examples are given below with respect to determining the mode and priority of various devices within a premise. These are merely exemplary and meant to provide further explanation. In one exemplary situation, similar to that shown in FIG. 1, a mobile device may request power from a laptop computer. In this instance, the laptop computer may be powered via an AC adaptor. While the AC adaptor provides power directly to the laptop computer, the mobile device may in turn be charged by receiving electromagnetic waves from the transmitter of the laptop computer. The mobile device, while receiving power from the laptop, may in turn act as a hotspot and provide WiFi access. Thus, while the laptop provides power to the mobile device, the mobile device provides WiFi access to the laptop.

In another example, the laptop computer may be operating on battery power. If the battery power falls below a predefined threshold, the laptop may not be permitted by the power management system 135 to provide power to the mobile device.

Although not shown in FIG. 5, the power management system 135 may also predict how much power a device may consume based on past usage and currently running applications and programs. This anticipated power consumption may be used to determine whether a specific device has the capacity to act in the transmit mode and satisfy the power needs of the requesting device. For example, if a mobile device is currently running multiple apps as well as viewing or listening to media such as a movie, the anticipated power consumption may be much greater than that if the mobile device was in a standby mode. In both situations the mobile device may request power transmission from a laptop computer. However, depending on the battery power of the laptop computer, the request may be denied based on the anticipated usage. For example, if the laptop only has a remaining battery life of 15%, satisfying the mobile device's request for power when the mobile device has a high expected usage, the power management system 135 may determine that the laptop may not be able to satisfy the power needs of the mobile device and deny the request. If, on the other hand, the device has a low expected usage, the laptop may be instructed by the power management system 135 to operate in the transmit mode. Additionally or alternatively, because the laptop may not satisfy the power needs of the mobile device, the laptop itself may request power from another device within the premise. It may then, in turn, receive power, as well as transmit power to the requesting mobile device.

In yet another example, as shown in FIG. 3, an independent transmitter 185 may be powered by an AC source. The transmitter 185 may transmit power to a laptop (e.g., first device 105) within the premise. The laptop may then in turn transmit power to the mobile device (e.g., second device 110). It may be practical for the laptop to transmit power to the mobile device instead of the mobile device receiving power directly from the independent transmitter in certain circumstances. For example, the laptop may be located between the mobile device and independent transmitter 185. Thus, the laptop may operate both as a transmitter and a receiver. Further, if the mobile device is in close proximity to the independent transmitter 185, the mobile device may receive power directly from the transmitter 185 and in turn conserve the battery capacity of the laptop.

The disclosed system provides a power management system 135 configured to efficiently manage wireless power transfer between a plurality of device within a premise. The device may operate as both a power receiver and a power transmitter depending on the data collected about the devices within the premise. The directional alignment of the transmitter and receiver may be adjusted based on the location of each so as to optimize the wireless power transfer between the two. A cohesive system may be created when the second device 110 operates as a hot spot and provides wireless connectivity to the first device 105 and at the same time the first device 105 supplies power to the second device 110. Additionally, the power management system 135 may prioritize what devices should receive power, and from where the power should be received. Accordingly, disclosed is a dual mode device managed by a power management system 135 to efficiently and effectively manage wireless power transfer.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The Abstract of the Disclosure is provided to allow the reader to quickly ascertain the nature of the technical disclosure. It is submitted with the understanding that it will not be used to interpret or limit the scope or meaning of the claims.

The invention claimed is:

1. A system comprising:
   a first device and a second device each having a processor, wherein the first device is not in physical contact with the second device, the first device including a first wireless charging power transmitter and a first wireless charging power receiver; and
   at least one of the first device and second device having a power management system configured to:
      compare attribute data from the first device with attribute data from the second device, wherein the attribute data of the first device includes a location of the first device; and wherein the attribute data of the second device includes a location of the second; and
      select a power transfer mode for the first device based on the comparison of the attribute data from the first and second devices, wherein the selection of the power transfer mode causes the first device to one of accept wireless charging power from another device and transmit wireless charging power to the other device.

2. The system of claim 1, wherein the second device controls the power management system and the second device is the other device, and wherein the second device is configured to receive a request for power from the first device.

3. The system of claim 2, wherein the power management system is further configured to:
   receive subsequent attribute data from the first device and second device;
   compare the additional attribute data from the first device with the additional attribute data of the second device; and
   adjust the power transfer mode of the first device, based on the additional attribute data, from a previously selected power transfer mode to a power transfer mode not currently selected.

4. The system of claim 1, wherein the power management system is configured to cause the first device to physically move at least one of (i) the first wireless charging power receiver to enhance reception of wireless charging power from the other device and (ii) the first wireless charging power transmitter to enhance transmission of wireless charging power to the other device.

5. The system of claim 1, wherein the first device is configured to operate in the power transfer mode and provide a wireless network simultaneously, and wherein the second device is configured to receive the attribute data from the first device via the wireless network.

6. The system of claim 1, wherein the power management system is further configured to:
   detect additional devices and receive attribute data from each additional device, wherein the additional devices are capable of power transfer mode operation;
   compare the attribute data from the additional devices with the attribute data of the first and second devices; and
   select a device power transfer mode of the additional devices based on the comparison, wherein the selection of the device power transfer mode for each of the additional devices occurs while the first device one of transmits wireless charging power and accepts wireless charging power.

7. The system of claim 6, wherein the additional devices are not in physical contact with one another and the first and second devices, and wherein the first wireless charging power transmitter and the first wireless charging power receiver of the first device together comprise a transceiver.

8. The system of claim 1, wherein at least one of the first wireless charging power transmitter and the first wireless charging power receiver is a removable device coupled to the first device.

9. The system of claim 1, wherein the first device controls the power management system, and wherein the first device is configured to provide a request for power to the second device.

10. A method comprising:
    determining whether one of a first device and a second device controls a power management system to control at least an inductive transfer of power among the first and second devices;
    receiving, at the first device, a power transfer request from the second device;
    reading attribute data from the first device, wherein the attribute data of the first device includes a battery level threshold of the first device;
    determining whether to inductively transfer power from the first device to the second device based on the battery level threshold of the first device;
    reading attribute data from a third device, wherein the attribute data of the third device includes a battery level threshold of the third device;
    determining whether to inductively transfer power from the third device to the second device, wherein determining whether to inductively transfer power from the third device is based on both the battery level threshold of the third device and the battery level threshold of the first device; and
    inductively transferring power to the second device from one of the first device and the third device.

11. The method of claim 10, further comprising predicting how much power the second device may consume during a charging operation, wherein determining whether to inductively transfer power from the first device to the second device is further based on the predicting how much power the second device may consume.

12. The method of claim 10, further comprising receiving subsequent attribute data at predetermined periodic increments.

13. The method of claim 10, further comprising networking the first device and the second device via wi-fi such that the first device may communicate with the second device.

14. The method of claim 10, further comprising transferring control of the power management system to a device not presently in control of the power management system based on the device not presently in control receiving a request for power transfer.

15. The method of claim 10, further comprising instructing a transmitter of the first device to be directed towards the second device.

16. The method of claim 10, further comprising notifying the second device that the power transfer request is being processed, wherein the power transfer request one of requests power from the first device and requests power from any device.

17. The method of claim 10, wherein determining whether to inductively transfer power from the third device to the second device or from the first device to the second device is further based on at least one of (i) a location of the third device and a location of the second device and (ii) whether the first device is coupled to an alternating current (AC) power source or a battery power source.

18. A non-transitory computer-readable medium tangibly embodying computer-executable instructions, wherein the instructions cause a first device to:

manage inductive power transfer operations of the first device and a second device;
detect a third device;
read attribute data from each of the first device, the second device, and the third device, wherein (i) the attribute data of the first device includes a battery level attribute of the first device, (ii) the attribute data of the second device includes a battery level attribute of the second device, and (iii) the attribute data of the third device includes a battery level attribute of the third device; and
determine whether to engage in an inductive power transfer directly between the first device and the second device based on the battery level attribute of the first device, the battery level attribute of the second device, and the battery level attribute of the third device.

19. The medium of claim 18, further comprising instructions to cause the first device to compare a location of the third device with at least one of a location of the first device and a location of the second device.

20. A non-transitory computer-readable medium tangibly embodying computer-executable instructions, wherein the instructions cause a first device to:

manage inductive power transfer operations of the first device and a second device;
read attribute data of the first device and the second device, wherein the attribute data of the first device includes a first battery level attribute of the first device;
determine whether to engage in an inductive power transfer between the first device and the second device based on the battery level attribute of the first device;
detect a third device;
receive attribute data from the third device, wherein the attribute data from the third device includes a battery level attribute of the third device, and wherein the determination of whether to engage in the inductive power transfer between the first device and the second device is further based on the battery level attribute of the third device; and
cause the first device to compare a location of the third device with at least one of a location of the first device and a location of the second device.

* * * * *